United States Patent [19]

Lee

[11] Patent Number: 5,398,775
[45] Date of Patent: Mar. 21, 1995

[54] NOSE DIVE PREVENTING FRONT SUSPENSION ASSEMBLY

[75] Inventor: Unkoo Lee, Yongin-Kun, Rep. of Korea

[73] Assignee: Hyundai Motor Company, Seoul, Rep. of Korea

[21] Appl. No.: 54,278

[22] Filed: Apr. 30, 1993

[30] Foreign Application Priority Data

Jun. 24, 1992 [KR] Rep. of Korea ............ 92-11040

[51] Int. Cl.⁶ .................................................. B60G 3/20
[52] U.S. Cl. ............................... 180/274; 280/692; 280/691
[58] Field of Search ............... 280/691, 690, 785, 692, 280/693, 788, 673, 675, 703; 180/274

[56] References Cited

U.S. PATENT DOCUMENTS

| | | | |
|---|---|---|---|
| 3,861,729 | 1/1975 | Williams | 293/129 |
| 3,934,911 | 1/1976 | Oehlerking | 293/103 |
| 4,143,735 | 3/1979 | Schlanger | 180/274 |

FOREIGN PATENT DOCUMENTS 680820  3/1930  France .
267977  3/1927  United Kingdom .

OTHER PUBLICATIONS

Patent Abstract of Japan, vol. 6, No. 224, Nov. 9, 1982 & JP-A-57 126 742 (Nobuyoshi Kaneko).

*Primary Examiner*—Karin L. Tyson
*Attorney, Agent, or Firm*—Birch, Stewart, Kolasch & Birch

[57] ABSTRACT

A front suspension for a vehicle according to the present invention includes a knuckle joined to a wheel; a pair of upper and lower control arms connecting the knuckle to a car body; an absorbing member formed by unifying an impact absorber and a spring, and longitudinally arranged at a rear portion of a front bumper; an extension bar connected to a rear end portion of a damper rod of the impact absorber; a rotatable arm formed with a horizontal portion having a slider therein, a vertical portion being connected to a rear end portion of the extension bar and a connection portion of the vertical portion and the horizontal portion fixed on the car body at a rear upper portion of the wheel by a pivot member.

4 Claims, 3 Drawing Sheets

NOSE DIVE PREVENTING FRONT SUSPENSION ASSEMBLY

BACKGROUND OF THE INVENTION

1. Field of the Invention

This invention relates to a front suspension for a vehicle and, more particularly to a front suspension which serves as a front suspension in the case of formal running, and causes the front portion of the vehicle to lift rather than dive, simultaneously with absorbing impact energy to the front bumper at the time of a front collision, thereby protecting the driver and passengers.

2. Description of Related Art

A suspension for a vehicle is an impact-absorbing system which improves stability of the vehicle and provides an easy ride by absorbing vibration and impact from a road surface during the running by connecting an axle shaft to a car body or frame.

In such a conventional suspension for a vehicle, only its basic function required for suspension is achieved.

Accordingly, since the conventional suspension has no function which can prevent the front portion of the vehicle from diving by inertia of the vehicle when the vehicle collides with some other vehicle and is abruptly stopped in its forward momentum, the vehicle dives under a lower part of the other vehicle, and great loss of life will be caused even in a minor car collision.

Accordingly, vehicles having the above-described suspension are provided with a special impact-absorbing system which is disposed on a front bumper mounted on the front portion of a vehicle to more effectively absorb impact energy by assisting the absorbing function of a bumper.

According to the special impact-absorbing system as described above, an absorbing member made of a flexible material or a spring is disposed on a bumper stay located on a connecting portion of the front bumper and the car body or frame.

In case the special spring or absorbing member is, however, disposed on the bumper stay, although it has an effect to reduce impact energy which is transmitted from the bumper to the car body, it cannot prevent the front portion of the vehicle from diving during a collision. Thus, it has a disadvantage that the vehicle dives beneath a lower part of the vehicle with which it collides.

SUMMARY OF THE INVENTION

Therefore, an object of the present invention is to provide a front suspension for a vehicle which can make the front portion of the vehicle lift up rather than dive during a collision.

Another object of the present invention is to provide a front suspension for a vehicle which can use the absorbing force of the suspension system as an assistant absorbing means for a front bumper.

Still a further object of the invention is to provide a front suspension for a vehicle which does not require any special assistant absorbing means for a front bumper and results in a low cost of production.

To achieve the above objects, a front suspension for vehicle according to the present invention includes a knuckle joined to a wheel; upper and lower control arms connecting the knuckle to a car body; an absorbing member formed by unifying an impact absorber and a spring, and longitudinally arranged at a rear portion of a front bumper; an extension bar connected to a rear end portion of a damper rod of the impact absorber; a rotating arm formed with a horizontal portion having a slider therein, a vertical portion being connected to a rear end portion of the extension bar and a connection portion of the vertical portion and the horizontal portion fixed on the car body at a rear upper portion of the wheel by pivot means.

BRIEF DESCRIPTION OF THE DRAWINGS

The present invention will become more fully understood from the detailed description given hereinbelow and the accompanying drawings which are given by of illustration only, and thus are not limitative of the present invention, and wherein.

DETAILED DESCRIPTION OF THE PREFERRED EMBODIMENTS

Figure 1:
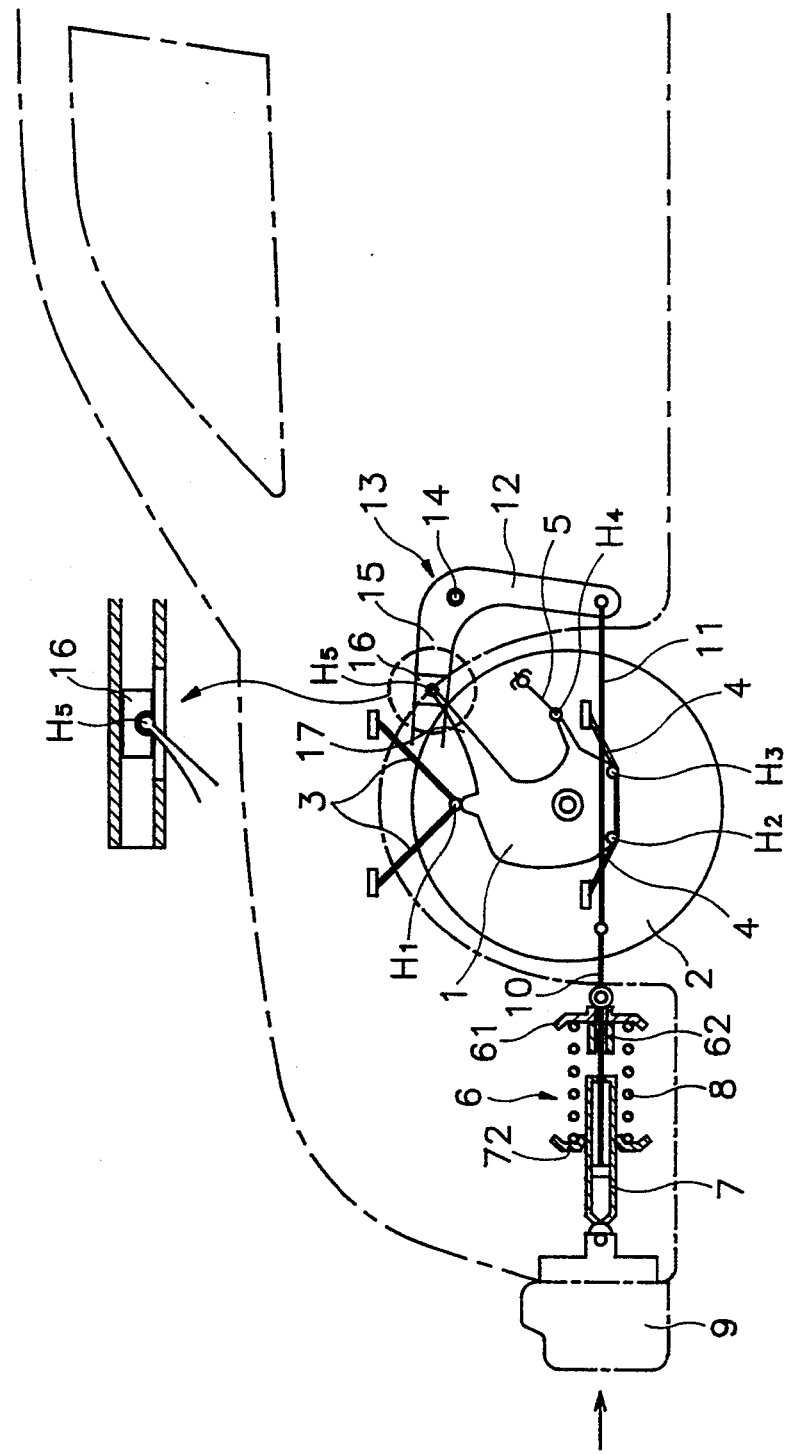
FIG. 1 is a partial view of a front suspension according to the present invention.

FIG. 1 is a partial view of a suspension according to the present invention.

A pair of upper control arms 3 and a pair of lower control arms 4 are respectively coupled to a knuckle 1 joined to a wheel 2 and connecting the wheel 2 to a car body. A tie rod 5 is connected to a rear portion of the knuckle 1.

The knuckle 1 includes a hinge point H1 connected to the pair of upper control arms 3, hinge points H2 and H3 on which the pair of lower control arms 4 are connected, a hinge point H4 on which the tie rod 5 is connected, and a hinge point H5 on which a rotating arm 13 disposed on the rear portion of the wheel 2 fixed on the car body is connected.

The rotating arm 13, having a horizontal portion 15 and a vertical portion 12, is fixed on the car body by a pivot means 14 to rotate clockwise or counterclockwise according to upward or downward movement of the knuckle 1. The rotating arm 13 is divided into a horizontal portion 15 and a vertical portion 12 at the point where the pivot means 14 are installed.

A slider 16 is inserted into the front end portion of the horizontal portion 15 of the rotating arm 13, and connected to the hinge point H5 of a connecting arm 17 of the knuckle 1.

To insert the slider 16 into the horizontal portion 15 of the rotating arm 13, the front end portion of the horizontal portion 15 is provided with a groove or hole, as shown in FIG. 1, such that the slider can move.

The inserting method of the slider as mentioned above is not limited to the preferred example of this invention.

Also, the vertical portion 12 of the rotating arm 13 is connected to the front bumper 9 through the absorbing means 6, and the absorbing means 6 absorbs impact in the case of collision and is connected to the lower part of the vertical portion of the rotating arm by an extension bar 11 to transmit the absorbed impact to the vertical portion of the rotating arm 13.

This absorbing means 6 includes a shock absorber 7, a front spring seat 72 attached to the outside of the shock absorber 7, and an elastic member 8 whose side portion is placed on the seat 72.

The elastic member 8 is interposed between a rear spring seat 61 having a bumper stopper 62, and fixed on the car body and the front spring sheet 72 to compress or expand.

The constitution described in FIG. 1 is independently mounted on left and right front wheels.

Figure 2:
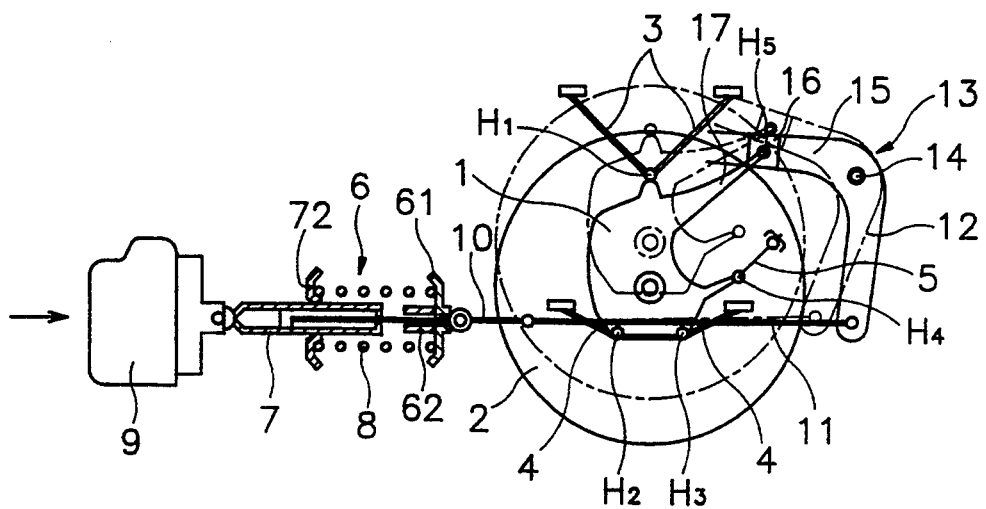
FIG. 2 is an operational diagram depicting ascension of a front wheel according to the present invention.

FIG. 2 is an operational diagram of the suspension according to the present invention when the wheel 2 receives vibration or impact by projecting objects on road at the time of running, so that the wheel lifts up as shown in broken line.

When the wheel 2 lifts up, the knuckle 1 is designed to rise up according to moving traces of the upper and lower control arms 3 and 4, and at the same time, the connecting arm 17 is designed to push the horizontal portion 15 of the rotating arm 13 upward through the slider 16.

In the above case, the rotating arm 13 rotates clockwise in the drawing, centering around the pivot means 14, thereby pushing the extension bar 11 forward. When the extension bar 11 is pushed forward, the pushing force is transmitted to the absorbing member 6 via a damper rod 10 such that the absorption is realized by the shock absorber 7 and elastic member 8 of the absorbing means 6.

Figure 3:
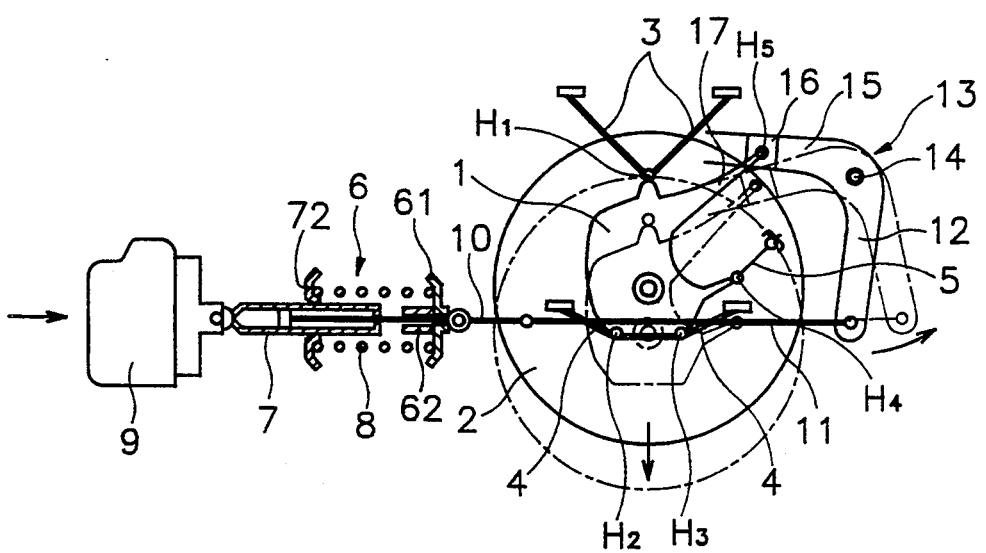
FIG. 3 is an operational diagram depicting descention of the front wheel according to the present invention.

FIG. 3 is an operational diagram of the suspension according to the present invention when the wheel 2 receives vibration or impact by a hole in the road such that the wheel drops down.

When the wheel 2 drops down, the knuckle 1 is designed to also drop down according to moving traces of the upper and lower control arms 3 and 4, and at the same time, the connecting arm 17 is designed to pull the horizontal portion 15 of the rotating arm 13 downward through the slider 16.

In the above case, the rotating arm 13 rotates counterclockwise in the drawing, centering around the pivot means 14, thereby pulling the extension bar 11 backward.

When the extension bar 11 is pulled backward, the pulling force is transmitted to the absorbing means 6 via the damper rod 10 such that the absorption is realized by the shock absorber 7 and elastic member 8 of the absorbing means 10.

The operation as described above is repeatedly accomplished when the vehicle vibrates up or down during the running, and the vibration and impact from a road surface are absorbed.

Further, in addition to the above-described operation, when the front bumper 9 receives an impact generated by a collision, the impact force is transmitted to the absorbing means 6 located on the rear portion of the front bumper 9, and the damper rod 10 is pushed, simultaneously with reducing the impact.

Figure 4:
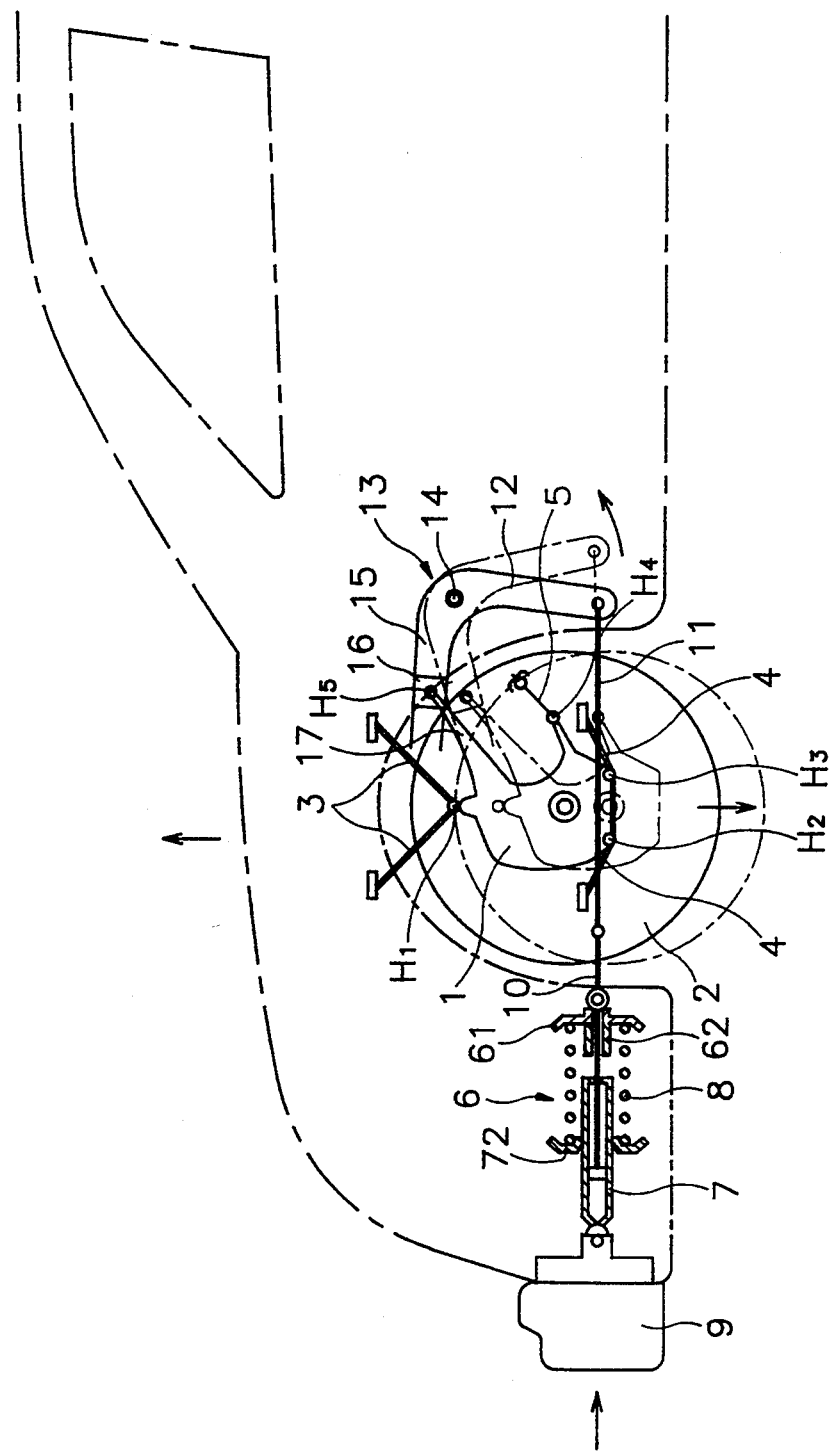
FIG. 4 is an operational diagram depicting impact to the bumper in a collision according to the present invention.

In the above case, the extension bar 11 pushes the low end portion of the vertical portion 12 of the rotating arm 13 backward, and makes rotating arm 13 rotate counterclockwise as shown in the broken line of FIG. 4.

When the rotating arm 13 rotates counterclockwise, the connecting arm 17 connected to the horizontal portion 15 pushes the knuckle 1 downward.

Although the wheel 2 receives a downward force when the knuckle 1 is pushed downward, since the wheel is contacting the road, it will lift the car body in reaction to the force pushing the wheel downward.

Accordingly, when the vehicle is in a collision, the impact force is absorbed on the bumper 9 and the absorbing means 6, and the car body is lifted to obtain a safer collision.

The suspension system according to the present invention as described above can be utilized as a rear suspension as well as a front suspension, if the parts are arranged reversely, and the same effect can be obtained.

Further, as described in the above embodiment, the vehicle suspension according to the present invention carries out the function of a suspension in formal running, and when the vehicle is in a collision, its front portion will lift rather than dive downward such that the safety of the vehicle increases.

In addition, since the absorbing force of the suspension can be utilized as assistant absorbing means, the special assistant absorbing means for the front bumper is not needed, which results in a low cost of production.

What is claimed is:

1. A front suspension for a vehicle, comprising:
a pair of upper and a pair of lower control arms connecting a knuckle joined to a wheel of a car body:
absorbing means, having a shock absorber, an elastic member and a damper rod connected to the shock absorber, said absorbing means being disposed on a rear portion of a front bumper, for absorbing an impact energy of the front bumper; and
a rotatable arm and a extension bar which connect the knuckle to the absorbing means to prevent a front portion of the wheel from being pushed down and for absorbing an impact energy of the wheel from a road,
said rotatable arm having a horizontal portion, a vertical portion, and a connecting portion of the horizontal and vertical portion pivotally connected to the car body,
said horizontal portion being connected to the knuckle, said vertical portion being connected to the extension bar, and
an end portion of said extension bar being connected to the damper rod of said absorbing means,
wherein the knuckle includes a first hinge point connected to a jointed portion of the pair of upper control arms, second and third hinge points respectively connected to each one of the pair of lower control arms, a fourth hinge point connected to a tie rod, and a fifth hinge point connected to said rotatable slider which is movably disposed on the horizontal portion of said rotatable arm.

2. The front suspension as claimed in claim 1, wherein the slider is movably disposed in the inside of the horizontal portion of the rotatable arm.

3. The front suspension as claimed in claim 1, wherein the slider is movably inserted into an outside of the horizontal portion of the rotatable arm.

4. The front suspension as claimed in claim 1, wherein the absorbing means includes a shock absorber having a cylinder connected to the front bumper, a front spring seat attached to the outside of the shock absorber, a rear spring seat fixed on the car body and having a bumper stopper and an elastic member interposed between the front spring seat and the rear spring seat.

* * * * *